(12) United States Patent
Masuko et al.

(10) Patent No.: US 10,419,277 B2
(45) Date of Patent: Sep. 17, 2019

(54) USER IDENTIFYING DEVICE, USER IDENTIFYING METHOD, AND USER IDENTIFYING PROGRAM

(71) Applicant: Rakuten, Inc., Setagaya-ku, Tokyo (JP)

(72) Inventors: Soh Masuko, Setagaya-ku (JP); Takafumi Inoue, Setagaya-ku (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 327 days.

(21) Appl. No.: 15/165,712

(22) Filed: May 26, 2016

(65) Prior Publication Data

US 2016/0352563 A1 Dec. 1, 2016

(30) Foreign Application Priority Data

May 29, 2015 (WO) .................. PCT/JP2015/065538

(51) Int. Cl.
| | |
|---|---|
| *G06F 15/173* | (2006.01) |
| *H04L 12/24* | (2006.01) |
| *H04L 29/06* | (2006.01) |
| *H04L 12/26* | (2006.01) |

(52) U.S. Cl.
CPC ........ *H04L 41/069* (2013.01); *H04L 41/0686* (2013.01); *H04L 43/0817* (2013.01); *H04L 67/42* (2013.01)

(58) Field of Classification Search
CPC .............. H04L 41/069; H04L 41/0686; H04L 43/0817; H04L 67/42
USPC ....................................................... 709/224
See application file for complete search history.

(56) References Cited

U.S. PATENT DOCUMENTS

| | | | | |
|---|---|---|---|---|
| 2005/0138383 A1* | 6/2005 | Vainstein | ............... | G06F 21/645 713/178 |
| 2008/0320343 A1* | 12/2008 | Eickmeyer | .......... | G06F 11/0709 714/57 |
| 2009/0254313 A1* | 10/2009 | Armour | ............... | G06F 11/3423 702/187 |
| 2013/0198574 A1* | 8/2013 | Higley | ................ | G06F 11/0727 714/45 |

FOREIGN PATENT DOCUMENTS

JP 2013-254431 A 12/2013

* cited by examiner

*Primary Examiner* — Atta Khan
(74) *Attorney, Agent, or Firm* — Sughrue Mion, PLLC (57) ABSTRACT

A user identifying system includes a user terminal and a server for communicating with the terminal. The terminal includes a detecting means that detects an event of a failure in accessing a service provided by the server, a recording means that records a timestamp indicating time of a failure in accessing the service when the event is detected, and a transmitting means that transmits, to the server, the timestamp and identification information allowing the server to identify the user of the terminal. The server includes a receiving means that receives the identification information and the timestamp transmitted from the transmitting means, and a specifying means that specifies a user identified by the identification information received by the receiving means when access by the terminal related to the timestamp has been made during an inaccessibility period wherein access to a service provided by the server has been unacceptable.

9 Claims, 9 Drawing Sheets

| 20150511 | 19:39:05 |
|----------|----------|
| 20150511 | 19:41:35 |
| ⋮ | ⋮ |

*Fig.5*

| INACCESSIBILITY PERIOD | INACCESSIBILITY PERIOD |
|---|---|
| 20150511 19:37:30 - 20150511 20:05:00 | MAINTENANCE |
| 20150511 19:37:30 - 20150511 20:05:00 | SERVER HALT |
| ⋮ | ⋮ |

USER IDENTIFYING DEVICE, USER IDENTIFYING METHOD, AND USER IDENTIFYING PROGRAM

TECHNICAL FIELD

The present invention relates to a user identifying system, a user identifying method, and a user identifying program.

BACKGROUND

There is a technique for identifying a user who has requested the use of a service in the event of a server failure by acquiring the IP address of a sender from packet information and reading a login ID stored in association with the IP address when a failure occurs in the server (for example, see Japanese Unexamined Patent Publication No. 2013-254431).

SUMMARY

However, the above-described technique is unable to identify a user who has attempted to make access when an access log cannot be recorded due to the occurrence of a failure in the server.

In light of the above, an object of the present invention is to identify a user who has attempted to make access during a server failure.

To solve the above problem, a user identifying system according to one aspect of the present invention is a user identifying system including a terminal of a user and a server capable of communicating with the terminal, wherein the terminal includes a detecting means configured to detect an event of a failure in accessing a service provided by the server, a recording means configured to record a timestamp indicating time of a failure in accessing the service when the event is detected, and a transmitting means configured to transmit, to the server, the timestamp recorded by the recording means and identification information allowing the server to identify the user of the terminal, and the server includes a receiving means configured to receive the identification information and the timestamp transmitted from the transmitting means, and a specifying means configured to specify a user identified by the identification information received by the receiving means when access by the terminal related to the timestamp received by the receiving means has been made during an inaccessibility period wherein access to a service provided by the server has been unacceptable.

A user identifying method according to one aspect of the present invention is a user identifying method in a user identifying system including a terminal of a user and a server capable of communicating with the terminal, the method including a detecting step, in the terminal, of detecting an event of a failure in accessing a service provided by the server, a recording step, in the terminal, of recording a timestamp indicating time of a failure in accessing the service when the event is detected, and a transmitting step, in the terminal, of transmitting, to the server, the timestamp recorded in the recording step and identification information allowing the server to identify the user of the terminal, a receiving step, in the server, of receiving the identification information and the timestamp transmitted in the transmitting step, and a specifying step, in the server, of specifying a user identified by the identification information received in the receiving step when access by the terminal related to the timestamp received in the receiving step has been made during an inaccessibility period wherein access to a service provided by the server has been unacceptable.

A non-transitory computer readable recording medium storing a user identifying program according to one aspect of the present invention is a user identifying program causing a computer to function as a terminal in a user identifying system including the terminal of a user and a server capable of communicating with the terminal, the program causing the computer to implement a detecting function to detect an event of a failure in accessing a service provided by the server, a recording function to record a timestamp indicating time of a failure in accessing the service when the event is detected, and a transmitting function to transmit, to the server, the timestamp recorded by the recording function and identification information allowing the server to identify the user of the terminal.

According to the above-described aspects, when the terminal fails to access a service provided by the server, a timestamp indicating that time is recorded and transmitted to the server later together with identification information for identifying a user. In the server, the fact that access has been made during the inaccessibility period can be determined based on the timestamp, and it is thereby possible to specify a user who has attempted to make access during the inaccessibility period by using the identification information transmitted together with the timestamp.

In the user identifying system according to another aspect, the server may further include a notifying means configured to notify specifying information indicating being specified as a user having made access using the terminal during the inaccessibility period to an account of the user specified by the specifying means, and the terminal may further include a specifying information receiving unit configured to receive the specifying information.

In the user identifying system according to another aspect, when the event is detected, the detecting means may determine whether a failure in accessing the service is due to conditions of the terminal, and the recording means may record the timestamp when the event is detected and it is determined that the event is not due to conditions of the terminal by the detecting means.

According to the above aspects, because the timestamp is recorded only when a failure in accessing the service is not due to the conditions of the terminal, when access is failed due to the conditions of the terminal, the transmission of the timestamp and the identification information to the server and the identification of a user in the server are not performed. This prevents the user identifying process in the server from being performed improperly by the intention of the user of the terminal and also reduces the processing load in the server.

In the user identifying system according to another aspect, the detecting means may determine whether a failure in accessing the service is due to conditions of the terminal based on at least one of a radio wave condition related to communications of the terminal, an operative condition of a functional unit used for communications in the terminal, and an available capacity of a memory in the terminal.

According to the above aspect, it is appropriately determined whether a failure in accessing the service is due to the conditions of the terminal or not.

In the user identifying system according to another aspect, the transmitting means may transmit the identification information and the timestamp after lapse of a specified time from detection of the event by the detecting means or at restart of an application for accessing the service in the terminal.

According to the above aspect, because the transmission of the timestamp and the identification information from the terminal to the server is done when the state of being unable to accept access in the server ends and the terminal and the server are likely to be able to communicate with each other, it is possible to make sure to notify the server of the information that the terminal has failed to access the service.

In the user identifying system according to another aspect, the identification information may be user identification information for identifying a user of the terminal or equipment identification information for identifying the terminal.

According to the above aspect, because the user identification information is transmitted to the server, the server can identify the user without fail. Further, when the server has information about the association between the equipment identification information and a user, the server can identify the user based on the equipment identification information.

In the user identifying system according to another aspect, the specifying means may determine whether the access from the terminal has been made during the inaccessibility period by referring to history information containing an occurrence history of the inaccessibility period stemming from conditions of the server.

According to the above aspect, because it is determined whether the access from the terminal has been made during the inaccessibility period by referring to the history information of the inaccessibility period stored in the server, the accurate determination can be made.

In the user identifying system according to another aspect, the specifying means may estimate the inaccessibility period based on a distribution of times indicated by a plurality of timestamps received from the plurality of terminals, and determine whether the access from the terminal has been made during the inaccessibility period based on the estimated inaccessibility period.

According to the above aspect, because the inaccessibility period is estimated based on the distribution of times indicated by timestamps transmitted from the terminal, it is possible to determine whether access from the terminal has been made during the inaccessibility period or not even when the history information of the inaccessibility period is not stored in the server.

In the user identifying system according to another aspect, the transmitting means may further transmit terminal time information indicating time of transmission of the identification information and the timestamp, the time being measured in the terminal, and the specifying means may acquire, as server time information, time of receipt of the identification information and the timestamp by the receiving means, the time being measured in the server, and correct time indicated by the timestamp based on a difference between the time indicated by the terminal time information and the time indicated by the server time information.

According to the above aspect, because the time indicated by the timestamp is corrected based on a difference between the time measured by the terminal, which serves as the basis for the timestamp transmitted from the terminal, and the time measured in the server, it is possible to accurately specify the user who has made access during the inaccessibility period.

According to one aspect of the present invention, it is possible to identify a user who has attempted to make access during a server failure.

DETAILED DESCRIPTION

An embodiment of the present invention is described hereinafter in detail with reference to the appended drawings. Note that, in the description of the drawings, the same or equivalent elements are denoted by the same reference symbols, and the redundant explanation thereof is omitted.

Figure 1:
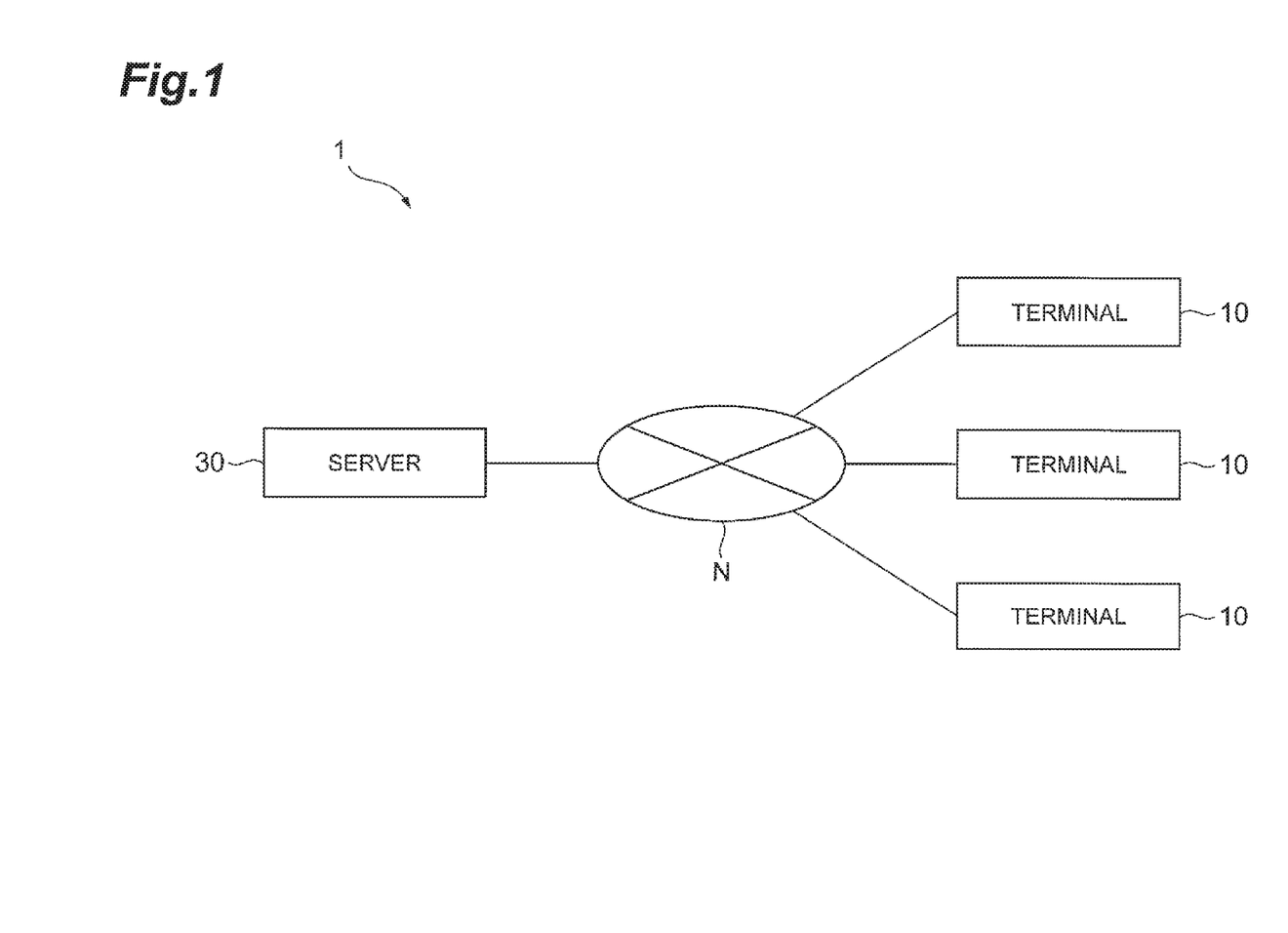
FIG. 1 is a view showing the device configuration of a user identifying system.

FIG. 1 is a view showing the device configuration of a user identifying system. As shown in FIG. 1, a user identifying system 1 includes a plurality of terminals 10 and a server 30 that can communicate with each other through a network N.

The user identifying system 1 is a system that allows the server 30 to identify a user of the terminal 10 when the terminal 10 fails to access a service provided by the server 30.

The server 30 according to this embodiment is a so-called service server that provides users with services. Specifically, the server 30 provides a service for providing products by electronic commerce or the like, a service for delivering desired information, a game and the like.

The terminal 10 is a device owned by a user, and it accesses a service provided by the server 30 through the network N. The terminal 10 is an advanced mobile phone (smart phone), for example, though a device that serves as the terminal 10 is not particularly limited, and it may be a mobile terminal such as a cellular phone or a personal digital assistant (PDA), a stationary or portable personal computer or the like. Although three terminals 10 are shown in FIG. 1, the number of terminals 10 is not limited thereto.

The terminal 10 can be provided with various services by accessing websites provided by the server 30, for example. A service is provided to a user of the terminal 10 after a login process using user identification information that identifies the user. Further, the terminal 10 may access services provided by the server 30 by using a dedicated application.

Figure 2:
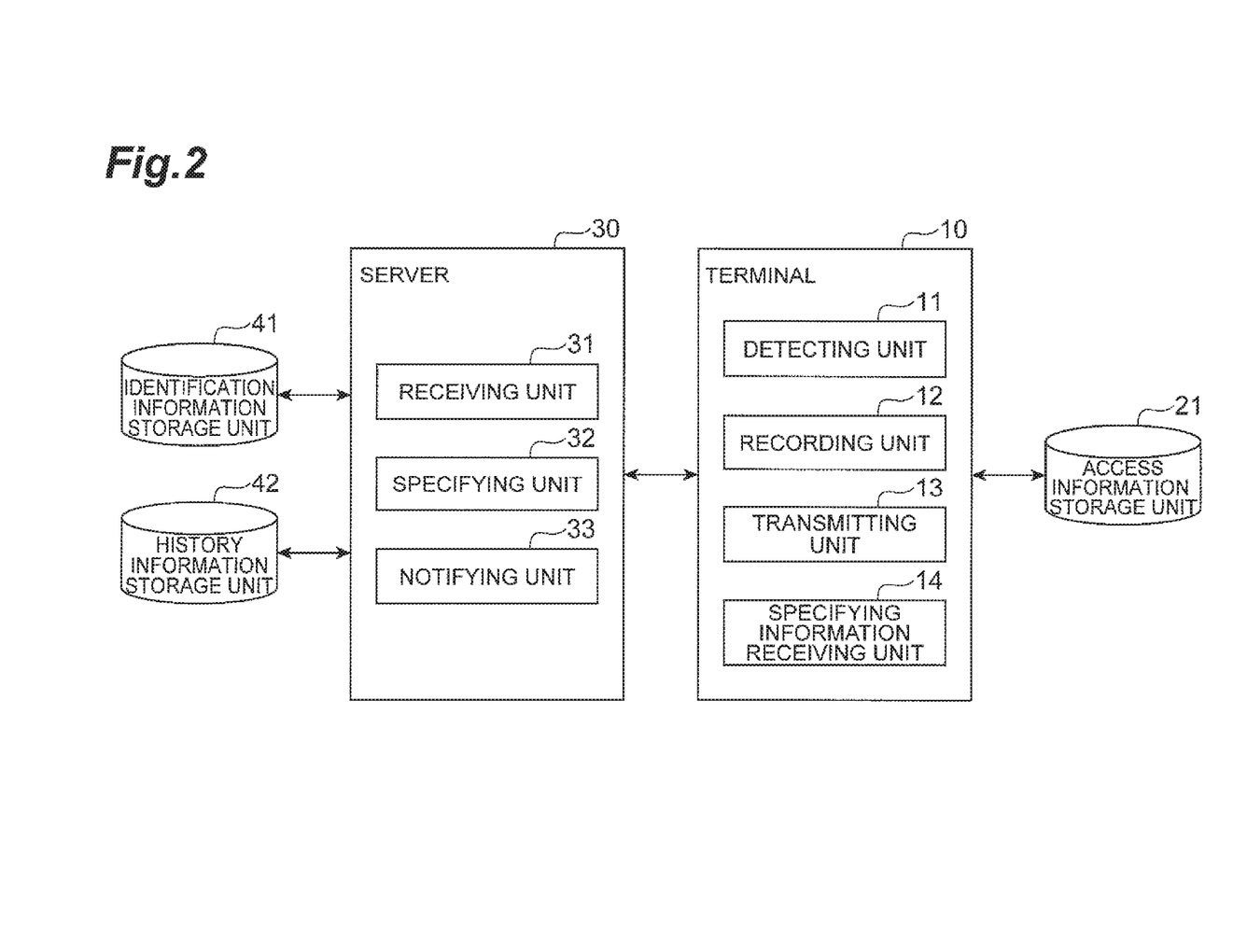
FIG. 2 is a view showing the functional configuration of a terminal and a server that constitute the user identifying system.

FIG. 2 is a block diagram showing the functional configuration of the terminal 10 and the server 30 that constitute the user identifying system 1.

The terminal 10 includes a detecting unit 11 (detecting means), a recording unit 12 (recording means), a transmitting unit 13 (transmitting means), and a specifying information receiving unit 14 (specifying information receiving means). Each of the functional units of the terminal 10 can access storage means such as an access information storage unit 21. The access information storage unit 21 may be placed in the terminal 10 or may be configured to be accessible from the terminal 10 through the network N.

The server 30 includes a receiving unit 31 (receiving means), a specifying unit 32 (specifying means), and a notifying unit 33 (notifying means).

Each of the functional units of the terminal 10 can access storage means such as an identification information storage unit 41 and a history information storage unit 42. The identification information storage unit 41 and the history information storage unit 42 may be placed in the server 30 or may be configured to be accessible from the server 30 through the network N.

Figure 3:
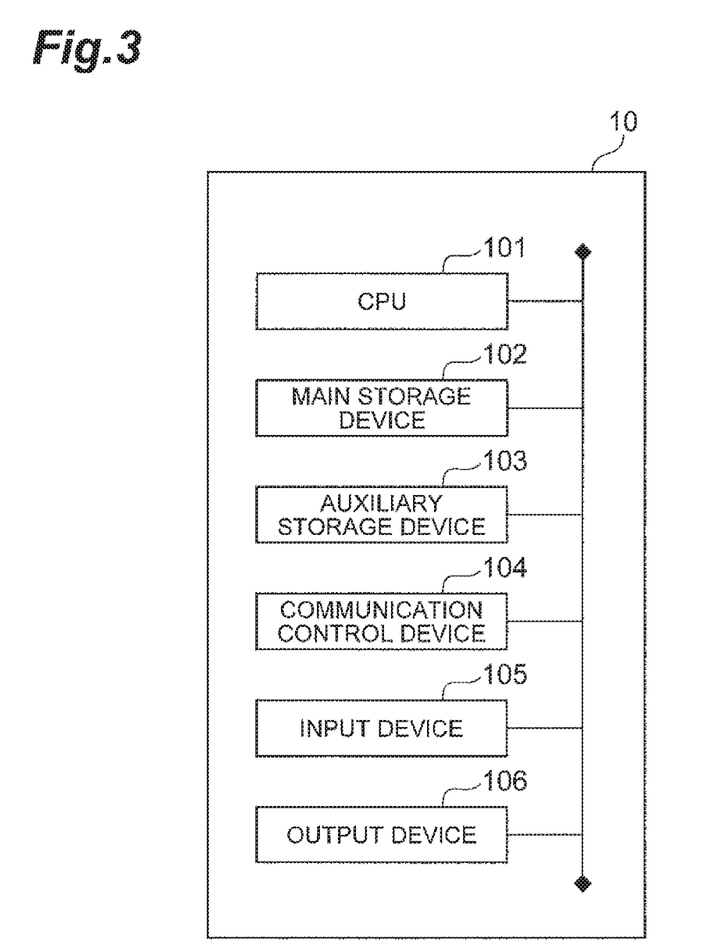
FIG. 3 is a view showing the hardware configuration of the terminal.

FIG. 3 is a view showing the hardware configuration of the terminal 10 of the user identifying system 1. As shown in FIG. 3, the terminal 10 is physically configured as a computer system that includes a CPU 10, a main storage device 102 such as memory like RAM and ROM, an auxiliary storage device 103 such as a hard disk, a communication control device 104 and the like. The user identifying system 1 may further include an input device 105 such as a keyboard, a touch panel and a mouse and an output device 106 such as a display.

The functions shown in FIG. 2 are implemented by loading given computer software onto hardware such as the CPU 101 or the main storage device 102 shown in FIG. 3, making the communication control device 104 and the like operate under control of the CPU 101, and performing reading and writing of data in the main storage device 102 or the auxiliary storage device 103. Data and database required for the processing is stored in the main storage device 102 or the auxiliary storage device 103. Like the terminal 10, the server 30 is also configured as a computer having the physical configuration as shown in FIG. 3.

The functional units of the terminal 10 are described hereinafter with reference back to FIG. 2. The detecting unit 11 is a part that detects the event of a failure in accessing a service provided by a server. To be specific, as the event of a failure in access, the detecting unit 11 may detect the event of a timeout when a certain period of time has elapsed without any response from the server 30 after the terminal 10 has attempted to access a service provided by the server 30, for example.

Further, when the detecting unit 11 detects the event of a failure in accessing a service, it may determine whether the failure in accessing a service is due to the conditions of the terminal 10 or not. To be specific, the detecting unit 11 may determine whether the failure in accessing a service is due to the conditions of the terminal 10 or not based on at least one of the radio wave condition related to communications of the terminal 10, the operative condition of the functional unit used for communications in the terminal 10, and the available capacity of a memory in the terminal 10.

For example, when there is some problem in the communication environment provided by a communications carrier related to communications of the terminal 10, access to a service provided by the server 30 is impossible. The detecting unit 11 detects such a state where access is impossible based on the radio wave condition related to communications.

Further, when a communication module in the terminal 10 is not powered on, for example, the detecting unit 11 detects that a failure in accessing a service is due to the conditions of the terminal 10.

Further, when the usable capacity of a memory in the terminal 10 is less than the amount required for providing a service, the event of a failure in accessing a service occurs as well. In such a case, the detecting unit 11 detects that a failure in accessing a service is due to the conditions of the terminal 10.

Figure 4:
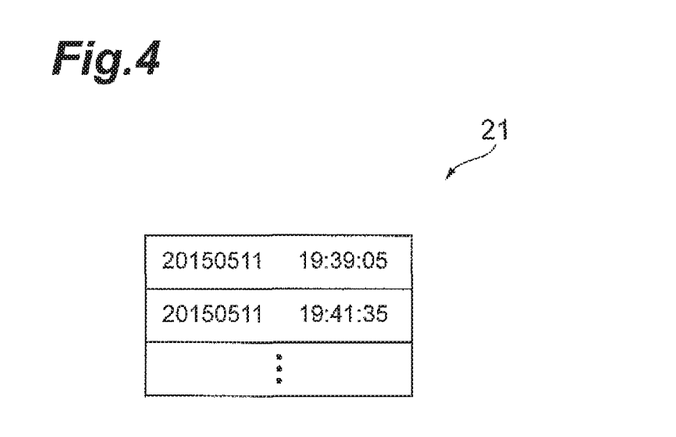
FIG. 4 is a view showing an example of a timestamp.

The recording unit 12 is a part that records a timestamp indicating the time of a failure in access when the event of a failure in accessing a service is detected by the detecting unit 11. In this embodiment, the recording unit 12 stores the timestamp indicating the time of a failure in access, as access information, into the access information storage unit 21. FIG. 4 is a view showing an example of a timestamp stored in the access information storage unit 21. As shown in FIG. 4, the access information storage unit 21 stores the timestamp "20150511 19:39:05", for example.

The recording unit 12 may record a timestamp only when the event of a failure in accessing a service is detected and further it is determined by the detecting unit 11 that the event is not due to the conditions of the terminal 10.

Because a timestamp is recorded in this manner, when access is failed due to the conditions of the terminal, the transmission of a timestamp and identification information to the server and the identification of a user in the server, which are described later, are not performed. This reduces the processing load in the server 30.

The transmitting unit 13 is a part that transmits, to the server 30, the timestamp recorded by the recording unit 12 and identification information with which the server 30 can identify a user of the terminal 10. To be specific, when a timestamp is recorded as the access information by the recording unit 12, the transmitting unit 13 may transmit the access information that contains the timestamp and the identification information after the lapse of a specified time from the detection of the event related to the timestamp or at the restart of an application for accessing a service. Alternatively, the transmitting unit 13 may transmit the access information when re-logging in to the service.

Because of such control, the transmission of access information from the terminal 10 to the server 30 is done when the state of being unable to accept access in the server 30 ends and the terminal 10 and the server 30 are likely to be able to communicate with each other, and it is thereby possible to make sure to notify the server 30 of the information that the terminal 10 has failed to access a service.

Note that the identification information that is transmitted to the server 30 by the transmitting unit 13 may be user identification information that identifies a user of the terminal 10 or equipment identification information that identifies the terminal 10.

For example, when a login process for receiving a service is already done in the terminal 10, the user identification information in the service is input in the terminal 10 in general cases. In this case, the transmitting unit 13 transmits the user identification information that can directly identify a user to the server 30.

On the other hand, when the terminal 10 has not acquired the user identification information, the terminal 10 transmits the equipment identification information that identifies the terminal 10 to the server 30. If a user has been provided with a service in the past by using the terminal 10, the server 30 can acquire the association between the user identification information of the user and the equipment identification information of the terminal 10. Thus, the server 30 can identify the user based on the equipment identification information.

The specifying information receiving unit 14 is a part that receives specifying information indicating the fact of being specified as a user who has made access using the terminal 10 during an inaccessibility period wherein access to a service provided by the server 30 has been unacceptable. The specifying information is described in detail later.

The functional units of the server 30 are described hereinafter. The receiving unit 31 is a part that receives the access information (the identification information and the timestamp) transmitted from the transmitting unit 13 of the terminal 10.

The specifying unit 32 is a part that specifies a user who is identified by the identification information received by the receiving unit 31 when access from the terminal 10 related to the timestamp received by the receiving unit 31 has been made during the inaccessibility period when access to a service provided by the server 30 has been unacceptable.

To be specific, the specifying unit 32 may determine whether access from the terminal 10 has been made during the inaccessibility period or not by referring to the history information storage unit 42. The history information storage unit 42 stores history information containing an occurrence history of the inaccessibility period that has occurred due to the conditions of the server 30.

Figure 5:
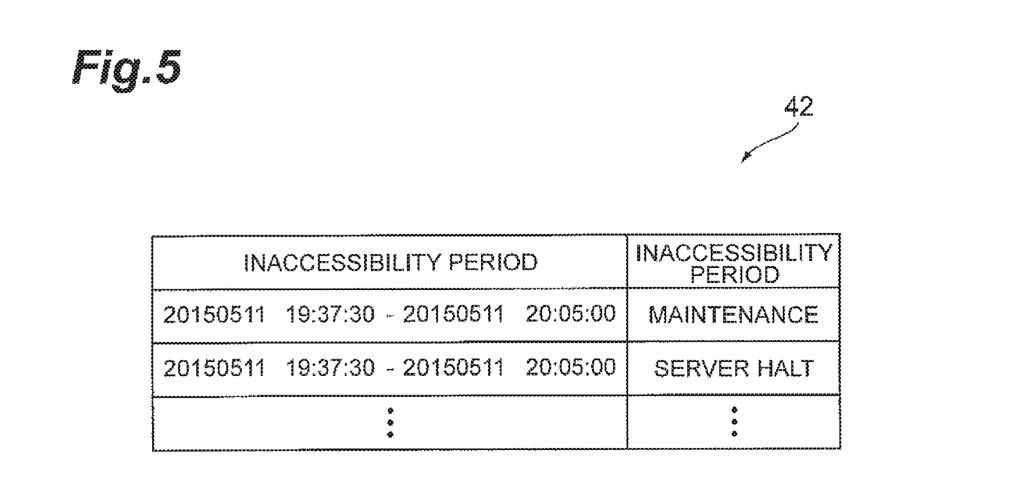
FIG. 5 is a view showing the structure of history information and an example of data stored in a history information storage unit.

FIG. 5 is a view showing an example of the history information stored in the history information storage unit 42. As shown in FIG. 5, the history information storage unit 42 stores the inaccessibility period and the reason why access has become unacceptable in association with each other. Referring to the history information, it is found that access has been impossible during the period from 19:37:30 to 20:05:00 on May 11, 2015 due to maintenance of the server 30, for example. Thus, when the date and time indicated by the timestamp contained in the access information corresponds to the inaccessibility period in the history information, the specifying unit 32 determines that access related to the access information has been made during the inaccessibility period.

Further, when the specifying unit 32 determines that access has been made during the inaccessibility period, it specifies a user who is identified by the identification information contained in the access information. When the identification information contained in the access information is user identification information, the specifying unit 32 can directly specify a user who is identified by the user identification information. On the other hand, when the identification information contained in the access information is equipment identification information, the specifying unit 32 specifies a user by referring to the identification information storage unit 41.

When a user accesses a service through the terminal 10 in the past, the server 30 can acquire the user identification information of the user and the equipment identification information of the terminal 10, and therefore the identification information storage unit 41 stores the acquired user identification information and equipment identification information in association with each other. The equipment identification information is identification information assigned to the terminal 10, and it may be MAC address, Advertising Identifier or the like, for example.

Figure 6:
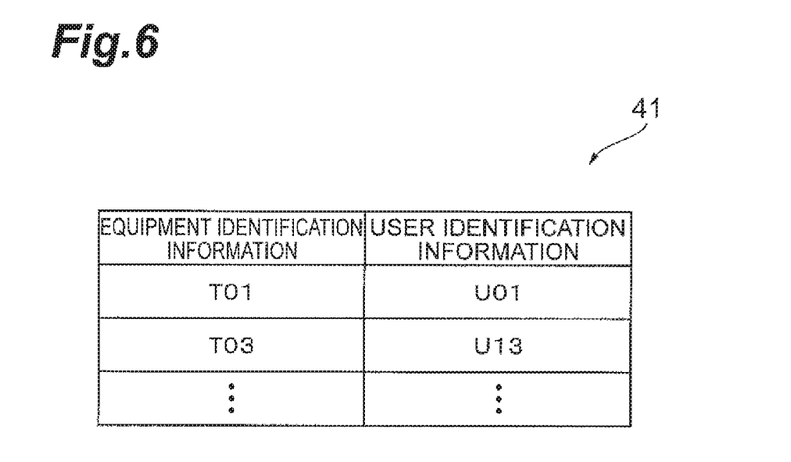
FIG. 6 is a view showing the structure of identification information and an example of data stored in an identification information storage unit.

FIG. 6 is a view showing an example of the identification information stored in the identification information storage unit 41. As shown in FIG. 6, the identification information storage unit 41 stores the user identification information in association with the equipment identification information. For example, when the equipment identification information contained in the access information is "T01", the specifying unit 32 acquires the user identification information "U01" that is associated with the equipment identification information "T01" as the user identification information of the user of the terminal 10 related to the access information by referring to the identification information storage unit 41, and specifies the user who is identified by the acquired user identification information.

Further, the specifying unit 32 may estimate the inaccessibility period based on the distribution of times indicated by timestamps contained in a plurality of access information received from a plurality of terminals 10, and determine whether access from the terminal 10 has been made during the inaccessibility period or not based on the estimated inaccessibility period. The estimation of the inaccessibility period based on the distribution of times of timestamps is described hereinafter with reference to FIG. 7.

Figure 7:
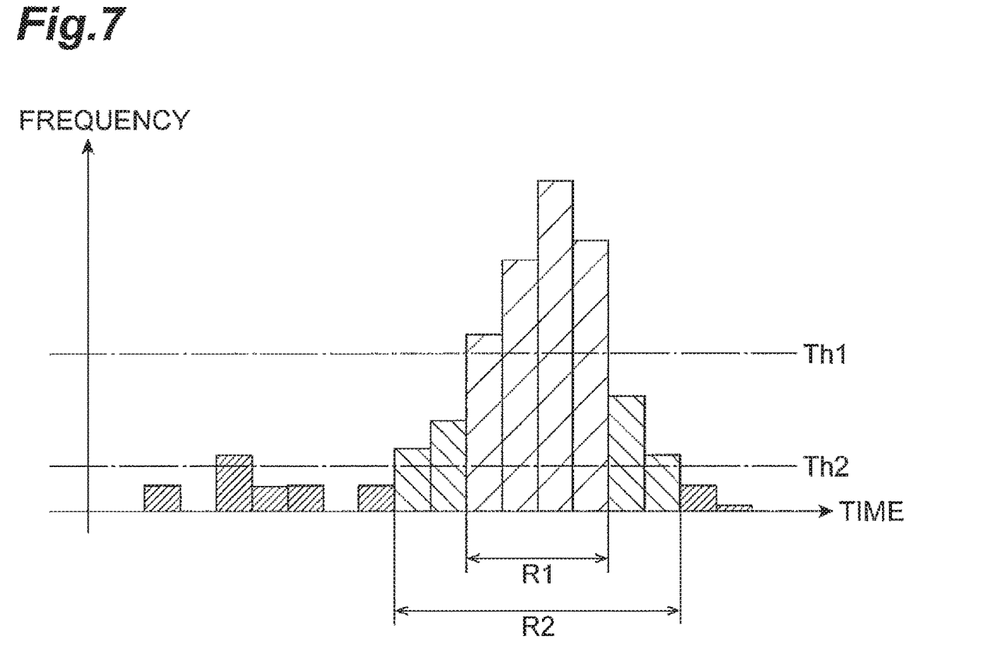
FIG. 7 is a view showing an example of the distribution of times indicated by time stamps.

FIG. 7 is a view showing the frequency of times indicated by timestamps from the plurality of terminals 10 received by the receiving unit 31. In a period during which a service provided by the server 30 is inaccessible, receipt of the access information containing the timestamp indicating the attempt to access the service during that period tends to increase. In view of such a tendency, the specifying unit 32 may estimate a period R1 where the frequency of times indicated by timestamps is higher than a specified threshold Th1 as the inaccessibility period. Note that the threshold Th1 may be a value that is a multiple of the average of the frequency of access.

Alternatively, the specifying unit 32 may estimate a period R2 where a specified period of time is added before and after the period R1 where the frequency of times indicated by timestamps is higher than the specified threshold Th1 as the inaccessibility period. Further, the specifying unit 32 may estimate the period R2 as the inaccessibility period by using a threshold Th2, which is a value obtained by multiplying the specified threshold Th1 by a specified coefficient and which is smaller than the threshold Th1, as a threshold.

As described above, by estimating the inaccessibility period based on the distribution of times indicated by timestamps transmitted from the terminal 10, it is possible to determine whether access from the terminal 10 has been made during the inaccessibility period or not even when the history information of the inaccessibility period is not stored in the server 30.

Note that, when terminal time information indicating the time of transmission of access information, which is the time measured in the terminal 10, is transmitted together with the access information from the transmitting unit 13 of the terminal 10, the specifying unit 32 may acquire, as server time information, the time of receipt of the access information by the receiving unit 31, which is the time measured in the server 30, and correct the time indicated by the timestamp contained in the access information based on a difference between the time indicated by the terminal time information and the time indicated by the server time information.

Because the timestamp contained in the access information is acquired based on the time measured by the terminal 10, when there is a difference between the clocking of the server 30 and the clocking of the terminal 10, it is not possible to accurately determine whether access related to the access information has been made during the inaccessibility period or not. The accurate determination can be made by correcting the time indicated by the timestamp based on the server time information and the terminal time information.

The notifying unit 33 is a part that notifies the specifying information to the account of the user specified by the specifying unit 32. The specifying information is information indicating the fact of being specified as a user who has made access using the terminal 10 during the inaccessibility period when access to a service provided by the server 30 has been unacceptable. To be specific, when a user logs in to a service with the user's own account by using the terminal 10, the notifying unit 33 notifies the specifying information to the terminal 10. Because the specifying information is notified to the account, when a user logs into a service with the user's own account by using a different terminal from the terminal 10 that has attempted to access the service, the specifying information is notified to the different terminal. In other words, the terminal to which the specifying information is transmitted is not limited to the terminal that has attempted to access the service or that has transmitted the access information.

Figure 8:
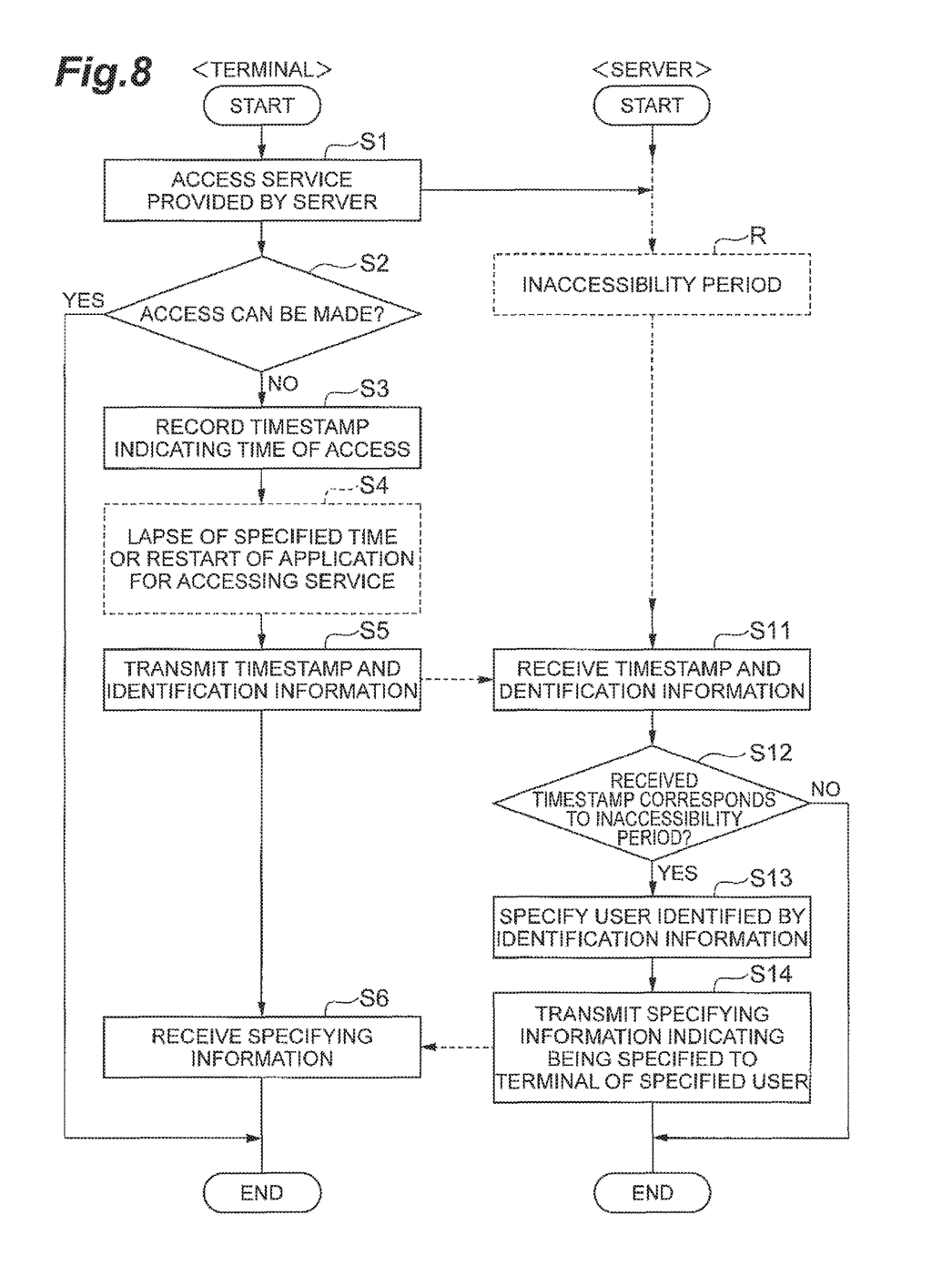
FIG. 8 is a flowchart showing a process of a user identifying method performed in the user identifying system.

The operation of the user identifying system 1 according to this embodiment is described hereinafter with reference to FIG. 8. FIG. 8 is a flowchart showing a process of a user identifying method performed in the user identifying system 1.

First, the terminal 10 attempts to access a service provided by the server 30 (S1). In the following Step S2, the detecting unit 11 determines whether access can be made to the service (S2). When the attempt to access in Step S1 corresponds to the inaccessibility period R, access cannot be made. When it is determined that access can be made to the service, the process ends. On the other hand, when it is not determined that access can be made to the service, the process proceeds to Step S3.

In Step S3, the recording unit 12 records a timestamp indicating the time when access is made in Step S1 (S3). Note that the recording unit 12 may record a timestamp only when it is determined that the event of a failure in accessing the service is not due to the conditions of the terminal 10.

After the timestamp is recorded in Step S3, when a specified time has elapsed from the detection of the event related to the timestamp or when an application for accessing the service is restarted (S4), the transmitting unit 13 transmits the access information that contains the timestamp and the identification information to the server 30 (S5).

In the server 30, the receiving unit 31 receives the access information (the identification information and the timestamp) transmitted from the terminal 10 in Step S5 (S11). Then, the specifying unit 32 determines whether the time indicated by the timestamp received in Step S11 corresponds to the inaccessibility period (S12). When it is determined that the time indicated by the timestamp corresponds to the inaccessibility period, the process proceeds to Step S13. On the other hand, when it is not determined that the time indicated by the timestamp corresponds to the inaccessibility period, the process ends.

In Step S13, the specifying unit 32 specifies a user who is identified by the identification information received by the receiving unit 31 in Step S11 (S13). The notifying unit 33 then notifies the specifying information to the account of the user specified by the specifying unit 32 in Step S13 (S14). In this embodiment, the specifying information is notified to the terminal 10 where the user logs in to the service with the user's own account. The specifying information is information indicating the fact of being specified as a user who has made access using the terminal 10 during the inaccessibility period when access to a service provided by the server 30 has been unacceptable.

In the terminal 10, the specifying information receiving unit 14 receives the specifying information transmitted from the server 30 (S6). Note that, although the terminal that has made access to the service in Step S1 and transmitted the access information containing the timestamp and the like in Step S5 receives the specifying information in Step S6 in the user identifying method according to this embodiment shown in FIG. 8, the receiving in Step S6 may be performed by another terminal to which the user's account is assigned.

Figure 9:
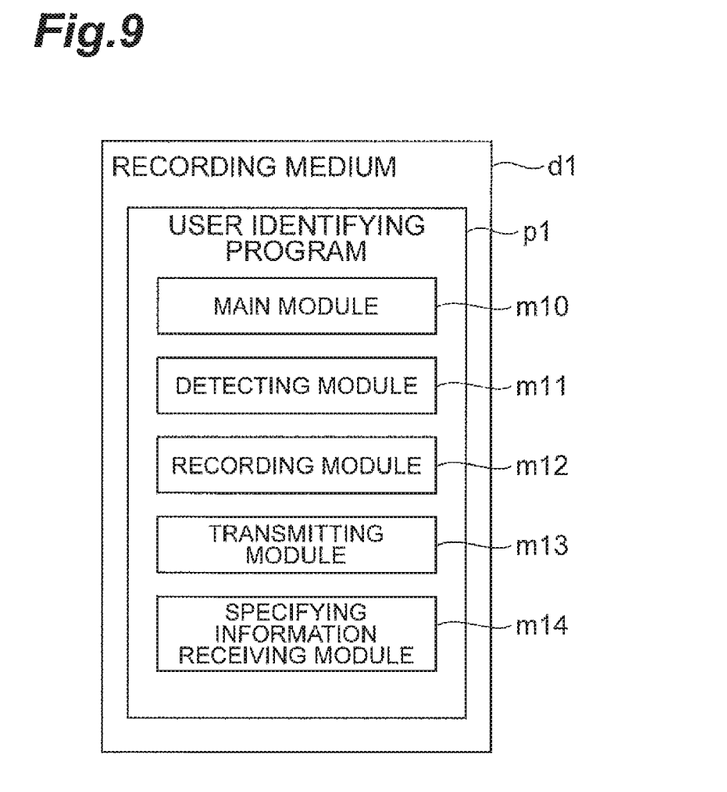
FIG. 9 is a view showing the configuration of a user identifying program performed in the terminal.

A user identifying program that causes a computer to function as the terminal 10 in the user identifying system 1 is described hereinafter with reference to FIG. 9. A user identifying program p1 includes a main module m10, a detecting module m11, a recording module m12, a transmitting module m13, and a specifying information receiving module m14.

The main module m10 is a part that exercises control over the user identifying process. The functions implemented by executing the detecting module m11, the recording module m12, the transmitting module m13 and the specifying information receiving module m14 are respectively equal to the functions of the detecting unit 11, the recording unit 12, the transmitting unit 13 and the specifying information receiving unit 14 of the user identifying system 1 shown in FIG. 1.

The user identifying program p1 is provided by a storage medium d1 such as CD-ROM, DVD-ROM or semiconductor memory, for example. Further, the user identifying program p1 may be provided as a computer data signal superimposed onto a carrier wave through a communication network.

In the user identifying system 1, the user identifying method and the user identifying program according to this embodiment described above, when the terminal 10 fails to access a service provided by the server 30, a timestamp indicating that time is recorded and transmitted later together with identification information for identifying a user to the server 30. In the server 30, the fact that access has been made during the inaccessibility period can be determined based on the timestamp, and it is thereby possible to specify a user who has attempted to make access during the inaccessibility period by using the identification information transmitted together with the timestamp.

An embodiment of the present invention is described in detail above. However, the present invention is not limited to the above-described embodiment. Various changes and modifications may be made to the present invention without departing from the scope of the invention.

What is claimed is:

1. A user identifying system comprising:
  a server in communication with a terminal over a network to provide a service;
  the terminal to access, over the network, the service provided by the server; and
  a recording storage to store a plurality of timestamps corresponding to a plurality of failures, by the terminal, in accessing the service provided by the server,
  the terminal comprising:
    at least one memory to store computer program code; and
    at least one processor to access said at least one memory and operate as instructed by said computer program code, said computer program code including:
      detecting code to cause at least one of said at least one processor to detect an event of a failure in accessing, by the terminal, the service provided by the server;
      recording code to cause at least one of said at least one processor to, in response to detecting the failure in accessing, by the terminal, the service provided by the server, record a timestamp, in the recording storage, indicating a time corresponding to the failure in accessing, by the terminal, the service provided by the server; and transmitting code to cause at least one of said at least one processor to transmit, from the terminal to the server, i) the recorded timestamp corresponding to the failure in accessing, by the terminal, the service provided by the server and identification information allowing the server to identify a user of the terminal, and ii) terminal time information indicating time of transmission of the identification information and the server comprises:

at least one server memory to store server computer code; and at least one server processor to access said at least one server memory and operated as instructed by said server computer code, said server computer code including:

receiving code to cause at least one of said at least one server processor to receive the identification information and the timestamp corresponding to the failure in accessing, by the terminal, the service provided by the server, transmitted from the terminal to the server; and specifying code to cause at least one of said at least one server processor to: i) identify the user of the terminal based on the identification information received from the terminal when a corrected time corresponds to the failure in accessing, by the terminal, the service provided by the server, corresponds to an inaccessibility period, wherein the inaccessibility period is a time period when the service provided by the server was unavailable ii) acquire, as server time information, a time of receipt measured at the server of the identification information and the timestamp by the receiving code and iii) perform, to produce the corrected time, a correction of time indicated by the timestamp based on a difference between the time indicated by the terminal time information and the time indicated by the server time information.

2. The user identifying system according to claim 1, wherein the server computer code further comprises notifying code to cause at least one of said at least one server processor to determine information of an account corresponding to the identified user and transmit the determined information to the terminal, and the computer program code further comprises specifying information receiving code to cause at least one of said at least one processor to receive the information transmitted by the server.

3. The user identifying system according to claim 1, wherein the detecting code further causes at least one of said at least one processor to determine whether the detected failure in accessing, by the terminal, the service provided by the server, is due to a condition of the terminal, and the recording code further causes at least one of said at least one processor to record the timestamp when the event of the failure is detected and it is determined that the detected event of the failure is not due to the condition of the terminal.

4. The user identifying system according to claim 3, wherein the detecting code further causes at least one of said at least one processor to determine whether the failure in accessing, by the terminal, the service provided by the server, is due to the condition of the terminal based on at least one of a radio wave condition related to communications of the terminal, an operative condition of a functional unit used for communications in the terminal, and an available capacity of a memory in the terminal.

5. The user identifying system according to claim 1, wherein the transmitting code further causes at least one of said at least one processor to transmit the identification information and the timestamp after lapse of a specified time from detection of the event or at restart of an application for accessing the service in the terminal.

6. The user identifying system according to claim 1, wherein the identification information includes at least one of user identification information for identifying the user of the terminal and equipment identification information for identifying the terminal.

7. The user identifying system according to claim 1, wherein the specifying code further causes at least one of said at least one server processor to determine whether the access from the terminal has been made during the inaccessibility period by referring to history information containing an occurrence history of the inaccessibility period stemming from conditions of the server.

8. The user identifying system according to claim 1, wherein the specifying code further causes at least one of said at least one server processor to estimate the inaccessibility period based on a distribution of times indicated by the plurality of timestamps received from a plurality of terminals, and determine whether the access from the terminal has been made during the inaccessibility period based on the estimated inaccessibility period.

9. A user identifying method comprising:

detecting, by a terminal, an event of a failure in accessing, by the terminal, a service provided by a server;

recording, by the terminal, a timestamp indicating time of the failure in accessing, by the terminal, the service when the event of the failure is detected;

transmitting from the terminal to the server: i) the timestamp recorded and identification information allowing the server to identify the user of the terminal, and ii) a first time measured in the terminal, as terminal time information, indicating time of transmission of the identification information;

receiving, by the server, the identification information and the timestamp transmitted from the terminal to the server;

acquiring, by the server as server time information, a second time of receipt of the identification information and the timestamp, the second time being measured in the server, and correcting, to produce a corrected time, time indicated by the timestamp based on a difference between the first time being measured in the terminal and the second time being measured in the server;

identifying, by the server, the user of the terminal based on the identification information received from the terminal when the corrected time corresponds to the failure, by the terminal, in accessing the service corresponds to an inaccessibility period, wherein the inaccessibility period is a time period when the service provided by the server was unavailable;

determining, by the server, specifying information of an account corresponding to the identified user;

transmitting, by the server, the specifying information to the terminal; and receiving, by the terminal, the specifying information transmitted by the server.

* * * * *